(No Model.)

G. McINROY.
AUTOMATIC BRAKE FOR VEHICLES.

No. 345,599. Patented July 13, 1886.

WITNESSES:
Donn Twitchell.
C. Sedgwick

INVENTOR:
G. McInroy
BY Munn & Co.
ATTORNEYS.

UNITED STATES PATENT OFFICE.

GEORGE McINROY, OF CHARLESTON, PENNSYLVANIA.

AUTOMATIC BRAKE FOR VEHICLES.

SPECIFICATION forming part of Letters Patent No. 345,599, dated July 13, 1886.

Application filed February 19, 1886. Serial No. 192,545. (No model.)

*To all whom it may concern:*

Be it known that I, GEORGE McINROY, of Charleston, in the county of Tioga and State of Pennsylvania, have invented new and useful Improvements in Brake Mechanism and Running-Gear for Vehicles, of which the following is a full, clear, and exact description.

My invention relates to brake mechanism and running-gear for vehicles, especially for wheeled vehicles; and it has for its object to provide a simple, strong, durable, and effective brake mechanism operated by the holdback of the horses on the tongue, and to provide also an arrangement of running-gear with the brake mechanism, whereby the brakes may be operated by the tongue irrespective of the relative positions of the front and rear sections of the running-gear.

The invention consists in certain novel features of construction and combinations of parts of the brake mechanism and running-gear, all as hereinafter fully set forth.

Reference is to be had to the accompanying drawings, forming a part of this specification, in which similar letters of reference indicate corresponding parts in all the figures.

Figure 1:
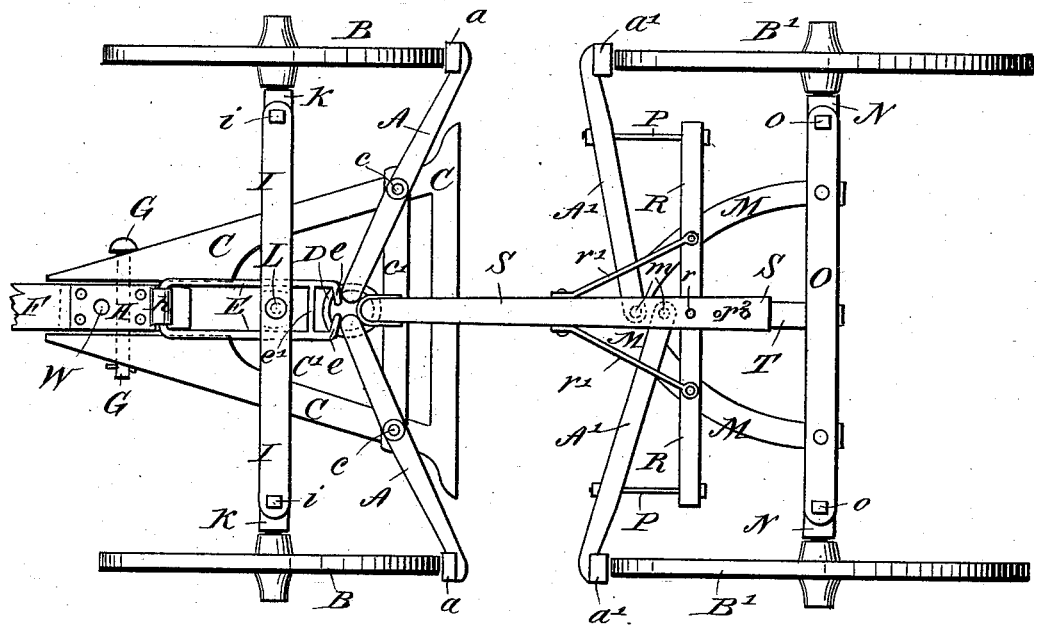
Figure 2:
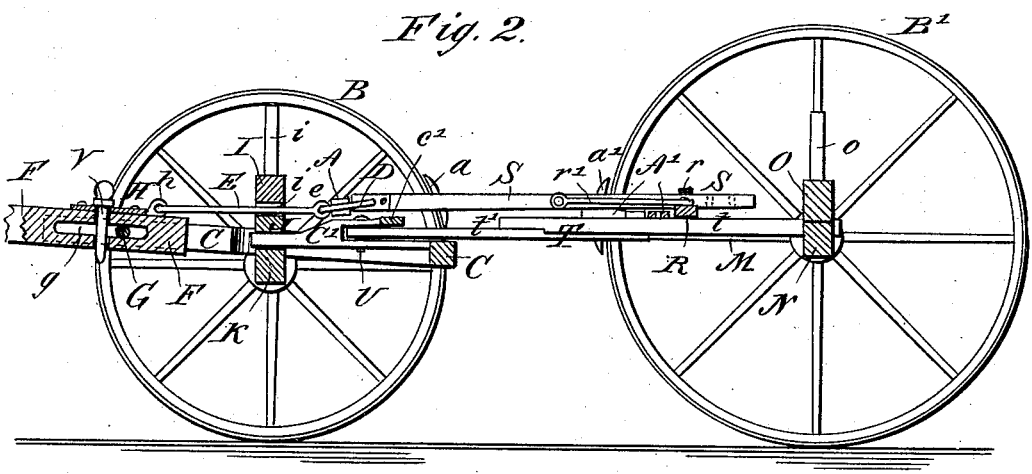
Figure 3:
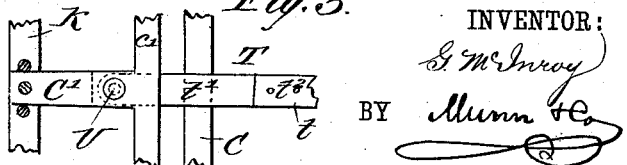

Figure 1 is a plan view of the brake mechanism and running-gear of a wagon made in accordance with my invention, the tongue being broken away. Fig. 2 is a central longitudinal vertical sectional elevation of the same, with the pin used when backing the wagon, applied to the tongue; and Fig. 3 is a detail plan view of parts of the forward axle and hounds and the reach.

The two forward brake-levers, A A, which have shoes or blocks $a\ a$, adapted to act on the front wheels, B B, of the wagon, are pivoted at $c\ c$, respectively, to a cross bar, $c'$, fixed to the forward hounds, C, of the vehicle, and the inner ends of the levers are connected to a ring, D, to which also are connected the back end parts, $e\ e$, of a strong metal yoke or link, E, which may have a rear cross bar or brace, $e'$. The forward end of the yoke E is attached pivotally to the back end of the tongue F at a point near the pin G, by which the tongue is pivoted to the hounds C, the connection of the yoke to the tongue being made preferably by the passage of the forward end of the yoke through an eye, $h$, formed at the rear end of a metal plate, H, bolted to the top of the tongue. The yoke E passes freely through the space $i$, between the wagon-body bedpiece I and the forward head-block, J, which, with the forward hounds, C, is held rigidly to the front axle, K, by bolts or otherwise. A pin, L, passed down through the bed-piece I serves as a pivot on which said bed-piece may swing with the wagon-body as the vehicle turns to either side. The two rear brake-levers, A' A', have shoes or blocks $a'\ a'$, adapted to act on the hind wheels, B' B', of the vehicle. The inner ends of the levers A' A' are pivoted at $m\ m$ to the reach or to the rear hounds, M, which latter are fixed to the hind axle, N, below the rear head-block or wagonbody bed-piece, O, which is fixed to the axle N in the usual way. Rods P P, connected to the levers A' A' near their outer ends, are also fixed to the ends of a cross-bar, R, which is held by a pin, $r$, and opposite side braces, $r'\ r'$, to a bar, S, which extends forward, and is connected to the ring D behind the inner ends of the forward brake-levers, A A, so that when the tongue F is thrust backward by the holdback of the team the levers A A will apply their brake-shoes $a\ a$ to the forward wheels, B B, and the levers A' A' will be operated by the levers A A, bar S, cross-bar R, and rods P P, to carry the brake-shoes $a'\ a'$ against the hind wheels, B' B', for stopping the vehicle or slackening its speed.

The reach T consists of two parts—one part, $t$, fixed to the rear axle, N, and hounds M, and the other part, $t'$, which is connected at its rear end to the forward end of part $t$ by bolts at $t^2$, and is connected pivotally to the forward hounds, C, or to the longitudinally-ranging slotted center bar, C', of the hounds by a pin or bolt, U, which stands immediately below the ring D, or in the axis of the joint connections by the ring, of the yoke E, brake-levers A A, and thrust-bar S; hence the pin U serves as a king-bolt on which the forward part of the running-gear may swing as the vehicle turns to either side, and by the arrangement of the joint-ring D directly over the pin the brakes may freely be applied by the backthrust of the tongue should the forward wheels, axle, and hounds be swung to either side to any extent by the holdback of the team.

A series of bolt-holes at $t^2$ in the two parts $t\ t'$ of the reach T allows the reach to be lengthened or shortened to accommodate the load carried, and there are a number of holes, $r^2$, in the back end of the thrust-bar S to receive the bolt $r$, and series of holes in the opposite sides of the bar S to admit of shifting the points of attachment of the forward ends of the braces, thus allowing the bar S to be shifted forward or backward as the reach is adjusted, for maintaining the connections of the bar S with the rear brake-levers, A', as will readily be understood.

The tongue F is slotted lengthwise and horizontally, as at $g$, to receive the pivot-pin G and allow the back-thrust of the tongue by the team, and when the wagon is to be backed a pin, V, will be passed vertically through a hole, W, in the tongue and across the slot $g$ in front of the pin G, whereby when the team holds back the thrust of the tongue will be taken by the pins V G, and the brakes will not be applied to the wheels.

Pins $i$ $i$ $o$ $o$ at the opposite ends of the bed-pieces I O, respectively, hold the wagon-box to place sidewise in the usual manner.

Having thus fully described my invention, I claim as new and desire to secure by Letters Patent—

1. The combination, in a wagon-brake mechanism and running-gear, of the tongue F, yoke E, bars S R, rods P P, brake-levers A' A', and the reach and rear hounds, said brake-levers being pivoted at their inner ends to the reach, and the bar R, connected at its ends by the rods P P to said brake-lever, being centrally connected to the bar S, substantially as and for the purposes herein set forth.

2. The combination, in a wagon-brake mechanism and running-gear, of brake-levers A A, pivoted to the forward hounds, C, the tongue F, movable endwise, a yoke, E, connected to the tongue, a ring, D, connecting the inner ends of levers A A and yoke E, a bar, S, connected to ring D and to the rear hounds or reach, a cross-bar, R, held to bar S, brake-levers A' A', pivoted to the reach or rear hounds, rods P P, connecting the brake-levers to bar R, and said joint-ring D positioned about in line vertically with the king-bolt U, which connects the forward and rear sections of the running-gear, substantially as herein set forth.

3. In a running-gear for vehicles, the combination, with the front and rear sections of the said gear, of a reach connected to the rear section and pivoted to the forward hounds by a pin, which forward end of reach is interposed between a lower and an upper bar of the forward hound and inserted into a longitudinally-ranging slotted center bar of the forward hounds, and which pin passes through said latter bar and the reach, substantially as and for the purpose set forth.

GEORGE McINROY.

Witnesses:
 JOSHUA ROUSE,
 N. Z. HODGE.